United States Patent
Cuevas et al.

(10) Patent No.: US 10,401,528 B2
(45) Date of Patent: Sep. 3, 2019

(54) HYBRID ELECTRIC AND MAGNETIC SURFACE TO BOREHOLE AND BOREHOLE TO SURFACE METHOD

(71) Applicants: Schlumberger Technology Corporation, Sugar Land, TX (US); SAUDI ARABIAN OIL COMPANY, Dhahran (SA)

(72) Inventors: Nestor Cuevas, Milan (IT); Michael Wilt, Walnut Creek, CA (US); Ping Zhang, Albany, CA (US); Jiuping Chen, San Pablo, CA (US); Daniele Colombo, Dhahran (SA); Gary Wayne McNeice, Dhahran (SA)

(73) Assignees: SCHLUMBER TECHNOLOGY CORPORATION, Sugar Land, TX (US); SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 14/951,920

(22) Filed: Nov. 25, 2015

(65) Prior Publication Data
US 2017/0146681 A1 May 25, 2017

(51) Int. Cl.
  *G01V 3/18* (2006.01)
  *G01V 3/26* (2006.01)
  *G01V 3/38* (2006.01)
  *G01V 1/40* (2006.01)
  *G01V 3/30* (2006.01)
(52) U.S. Cl.
  CPC ..................... *G01V 3/30* (2013.01)

(58) Field of Classification Search
  CPC ... G01V 3/30; G01V 3/38; G01V 1/40; G01V 3/26; G01V 2210/6163; G01V 3/18
  USPC .................. 324/339, 323, 338, 345; 702/6–7
  See application file for complete search history.

(56) References Cited

U.S. PATENT DOCUMENTS

| 6,484,566 B1 * | 11/2002 | Shin | A61B 5/02035 324/71.1 |
| 2005/0083063 A1 * | 4/2005 | Omeragic | G01V 3/28 324/338 |
| 2009/0302849 A1 * | 12/2009 | Vasconcelos | G01V 3/083 324/334 |
| 2010/0179762 A1 * | 7/2010 | Tabarovsky | G01V 3/28 702/7 |

(Continued)

OTHER PUBLICATIONS

Augustin et al., "A theoretical study of surface-to-borehole electromagnetic logging in cased holes," Geophysics, 1989, vol. 54, No. 1, pp. 90-99.

(Continued)

*Primary Examiner* — Neel D Shah
(74) *Attorney, Agent, or Firm* — Trevor G. Grove

(57) ABSTRACT

In one embodiment, a method includes receiving one or more datasets including measured vertical electric and magnetic fields excited by one or more radial and azimuthal electric field antennas from a downtool into one or more processors, wherein each of the one or more datasets corresponds to a different position of the one or more radial azimuthal electric field antennas, simultaneously inverting the one or more datasets using the one or more processors, and as a result of the simultaneous inversion, generating by the one or more processors a three-dimensional (3D) image of a portion of the geological formation.

17 Claims, 3 Drawing Sheets

(56) References Cited

U.S. PATENT DOCUMENTS

| | | | |
|---|---|---|---|
| 2010/0271030 A1* | 10/2010 | Reiderman | G01V 3/28 324/338 |
| 2012/0268135 A1 | 10/2012 | Marsala et al. | |
| 2013/0141102 A1* | 6/2013 | Donderici | G01V 3/18 324/338 |
| 2013/0169278 A1* | 7/2013 | Bittar | G01V 3/30 324/338 |
| 2014/0200808 A1* | 7/2014 | Zhang | G01V 3/38 702/7 |
| 2015/0337649 A1* | 11/2015 | Donderici | E21B 47/12 340/854.5 |
| 2016/0154133 A1* | 6/2016 | Donderici | G01V 1/50 367/12 |
| 2017/0010377 A1* | 1/2017 | Terentev | G01V 3/30 |

OTHER PUBLICATIONS

Baranwal et al., "3-d modelling study of borehole-seafloor marine csem for shallow water case", 71th EAGE Conference & Exhibition, 2009, vol. 5, pp. 3175-3179.

Liu et al., "Frequency-domain 3d borehole-surface electromagnetic modeling by the volume integral equation method", 70th EAGE Conference & Exhibition, Jun. 9-12, 2008, 5 pages.

* cited by examiner

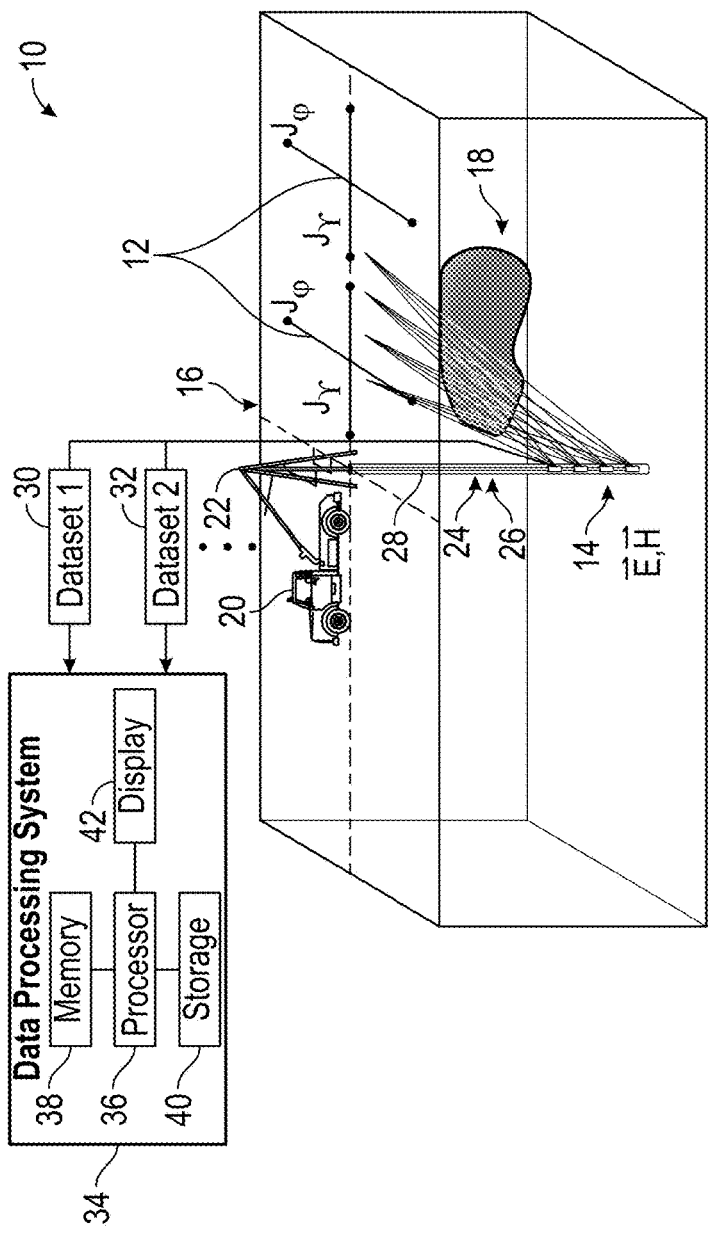
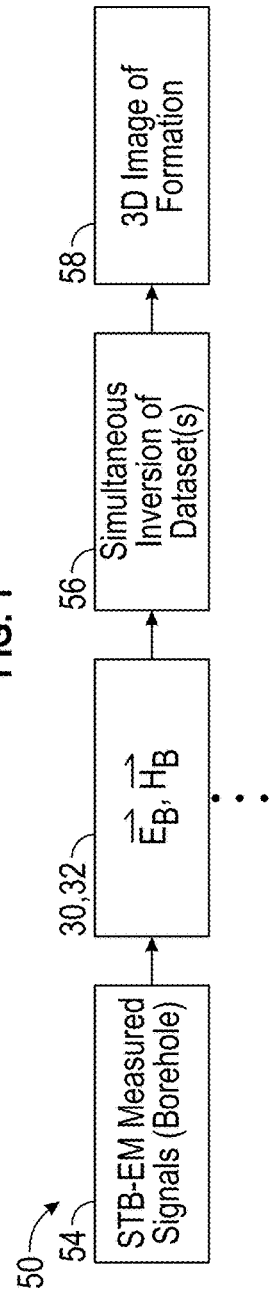
FIG. 1
FIG. 2

HYBRID ELECTRIC AND MAGNETIC SURFACE TO BOREHOLE AND BOREHOLE TO SURFACE METHOD

BACKGROUND

This disclosure relates to generally to oil and gas exploration and/or monitoring systems and more particularly to imaging formations using a hybrid electric and magnetic surface to borehole and borehole to surface method.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light.

Wells are generally drilled into a surface (land-based) location or ocean bed to recover natural deposits of oil and natural gas, as well as other natural resources that are trapped in geological formations. A well may be drilled using a drill bit attached to the lower end of a "drill string," which includes a drillpipe, a bottom hole assembly, and other components that facilitate turning the drill bit to create a borehole. For oil and gas exploration and/or monitoring, it may be desirable to have information about the subsurface formations that are penetrated by a borehole. More specifically, this may include generating images that visualize characteristics of the subsurface formations.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method includes measuring an electric field and a magnetic field of a geological formation excited by an electric source and a magnetic source, superimposing the electric field and the magnetic field using a processor, and as a result of the superimposing, generating by the processor an image of a portion of the geological formation.

In one embodiment, a method includes receiving one or more datasets including measured vertical electric and magnetic fields excited by one or more radial and azimuthal electric field antennas from a downtool into one or more processors, wherein each of the one or more datasets corresponds to a different position of the one or more radial azimuthal electric field antennas, simultaneously inverting the one or more datasets using the one or more processors, and as a result of the simultaneous inversion, generating by the one or more processors a three-dimensional (3D) image of a portion of the geological formation.

In one embodiment, a method includes receiving one or more datasets including measured electric and magnetic fields from an electromagnetic reader on the surface of a geological formation into one or more processors, wherein the electric and magnetic fields are generated by one or more downhole sources, simultaneously inverting the one or more datasets using the one or more processors, and as a result of the simultaneous inversion, generating by the one or more processors a three-dimensional (3D) image of a portion of the geological formation.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 1 is a schematic diagram of a drilling and/or monitoring system including one or more surface antennas and a downhole tool used to perform hybrid surface-to-borehole electromagnetic (STB-EM) measurements, in accordance with an embodiment of the present techniques;

FIG. 2 is a flow diagram of a method for generating a three-dimensional (3D) image of a formation using a data processing system based on downhole electric and magnetic fields due to radial and azimuthal surface electric antennas, in accordance with an embodiment of the present techniques;

DETAILED DESCRIPTION

Figure 3:
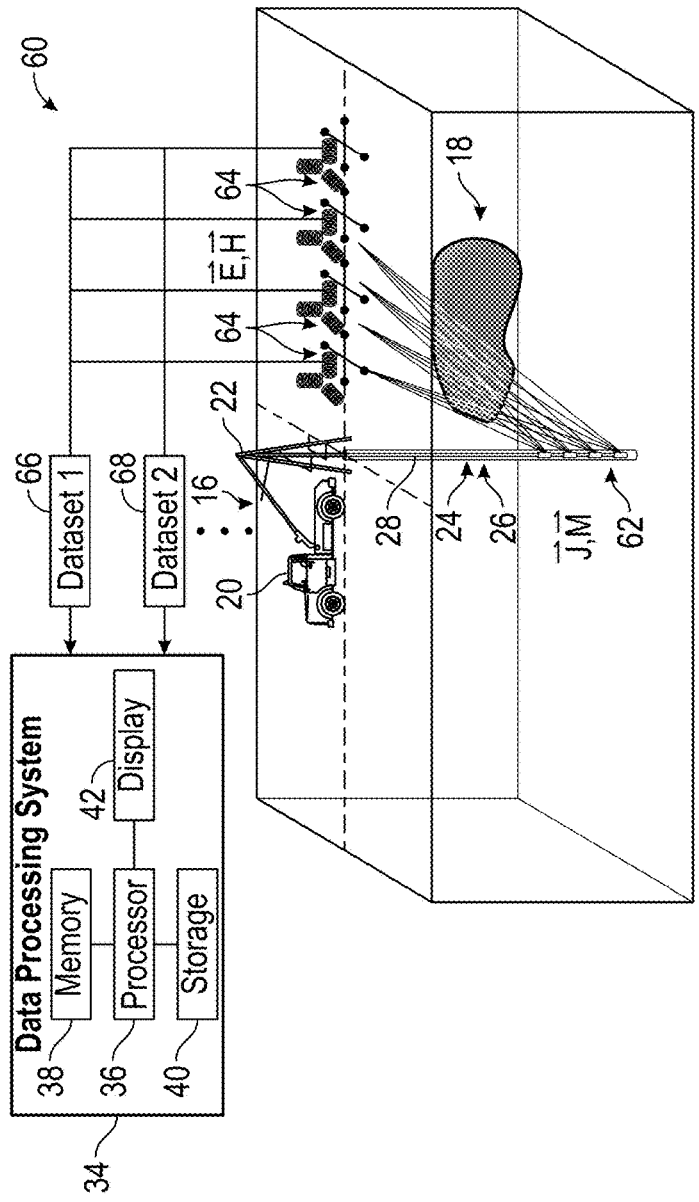
FIG. 3 is a schematic diagram of a drilling and/or monitoring system including one or more downhole vertical electric and magnetic field sources and one or more electromagnetic (EM) readers on the surface used to perform hybrid borehole-to-surface electromagnetic (BTS-EM) measurements, in accordance with an embodiment of the present techniques.

One or more specific embodiments of the present disclosure will be described below. These described embodiments are examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions can be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of this disclosure relate to performing hybrid surface-to-borehole electromagnetic (STB-EM) and/or borehole-to-surface electromagnetic (BTS-EM) measurements. In some embodiments, the hybrid STB-EM measurement may be obtained by measuring a vertical electric and magnetic field downhole that is excited by radial and azimuthal electric field antennas, respectively. The superposition of the fields due to both sources may be inverted simultaneously to produce a three-dimensional (3D) image. In some embodiments, the hybrid BTS-EM measurement may be obtained by downhole vertical electric and magnetic field sources that produce EM fields that are recorded on the surface. The superposition of the EM fields due to both sources are simultaneously inverted to produce a three-dimensional (3D) image.

The simultaneous inversion process benefits from the sensitivity to resistive media of the fields due to the radial source, as well as the sensitivity to conductive media of the magnetic fields produced by the azimuthal source. As such, the techniques are more efficient in the delineation of contacts between resistive and conductive targets. In addition, another benefit enabled using the disclosed techniques may include the inversion ratio between electric and magnetic fields downhole in STB-EM, or the surface impedance of the fields in BTS-EM, is less sensitive to the properties of the overburden between the surface and depth of investigation of interest in the survey (e.g., reservoir depths). It should be understood that the "hybrid" nature of the STB-EM and/or BTS-EM measurements may refer to (1) vertical electric and magnetic fields being measured, (2) EM measurements being excited by electric and magnetic sources, or (3) both (1) and (2) above.

FIG. 1 is a schematic diagram of a drilling and/or monitoring system 10 including one or more surface antennas 12 and a downhole tool 14 used to perform hybrid surface-to-borehole electromagnetic (STB-EM) measurements, in accordance with an embodiment of the present techniques. In particular, FIG. 1 illustrates surface equipment 16 above a geological formation 18. The surface equipment 16 may include the surface antennas 12, a vehicle 20, and a deploying system such as a drilling rig 22. In some embodiments, the surface antennas 12 may include radial and azimuthal surface antennas that excite electric and magnetic fields, respectively, that are measured by the downhole tool 14. The surface antennas 12 may transmit the electric and magnetic fields (e.g., electromagnetic waves) when a voltage is applied to and current flows through the surface antennas 12 as a result of electrons vibrating along the surface antenna 12. In some embodiments, the surface antennas 12 may take any suitable form, such as dipole, circular loops, parabolic, or the like. As described in detail below, various acquired datasets (e.g., electric and magnetic field measurements from each position of the surface antennas 12) from the downhole tool 14 may be simultaneously inverted to produce a 3D image of the vertical extent of the geological formation 18 of interest.

In the example of FIG. 1, a drilling operation has previously been carried out to drill a wellbore 24. In addition, an annular fill 26 (e.g., cement) may have been used to seal an annulus—the space between the wellbore 24 and casing joints and collars—with cementing operations. The surface equipment 16 may carry out various well logging operations to image portions of the geological formation 18, detect conditions of the wellbore 24, and the like. The well logging operations may measure parameters of the geological formation 18 (e.g., resistivity or porosity) and/or the wellbore 24 (e.g., temperature, pressure, fluid type, or fluid flowrate).

The example of FIG. 1 shows the downhole tool 14 being conveyed through the wellbore 24 by a cable 28 through the drilling rig 22 by the vehicle 20. Such a cable 28 may be a mechanical cable, an electrical cable, or an electro-optical cable that includes a fiber line protected against the harsh environment of the wellbore 24. In some embodiments, such cable 28 may be a slickline or a wireline, as understood by people in the field of wellbore drilling/logging operations. In other examples, however, the downhole tool 14 may be conveyed using any other suitable conveyance, such as coiled tubing. Data related to the geological formation 18 or the wellbore 24 gathered by the downhole tool 14 may be transmitted to the surface, and/or stored in the downhole tool 14 for later processing and analysis. The vehicle 20 may be fitted with or may communicate with a computer and software to perform data collection and analysis.

Because electromagnetic waves are made up of electric fields (E-fields) and magnetic fields (H-fields), the downhole tool 14 may include components for measuring E-fields and H-fields. E-fields and the H-fields may include a direction and a magnitude at any point in space and are therefore vector quantities. E-fields point away from a positive point charge and terminate at a negative point charge. H-field lines travel away from a positive (e.g., north) end and terminate on a negative (e.g., south) end. H-fields are perpendicular to the E-fields and orthogonal to the direction of propagation in a plane wave. The interaction between the H-fields and the E-fields in space may enable wave propagation.

Example components of the downhole tool 14 that may measure the E-fields and H-fields may include one or more sensors or probes, such as an electromagnetic field (EMF) meter, which may include a frequency selected receiver and/or a spectrum analyzer. For example, the EMF measurements may include frequency selective measurements where the electric and magnetic field excited by the radial and azimuthal electric field antennas 12, respectively, are measured by a frequency selected receiver or spectrum analyzer included in the downhole tool 14. In such an embodiment, the frequency selected receiver or spectrum analyzer enable monitoring a frequency range of interest. In some embodiments, the downhole tool 14 may include a broadband probe that enables broadband EMF measurements. The broadband probe may sense any signal across a wide range of frequencies. In some embodiments, the downhole tool 14 may include an electric field (E-field) sensor and a magnetic field (H-field) sensor that is used to measure the E-field and the H-field. In some embodiments, the E-field sensor and the H-field sensor may be mono-axial or isotropic (tri-axial). The mono-axial sensor or probe may sense the E-field or H-field linearly polarized in a given direction. The tri-axial sensor or probe may take three independent measurements using sensing elements orthogonal to each other.

The number of sensors or probes included in the downhole tool 14 may be proportional to the number of radial and azimuthal electric field antennas 12 present on the surface. That is, in some embodiments, there may be a one-to-one relationship between the number of radial and azimuthal electric field antennas 12 and the number of sensors or probes included on the downhole tool 14. However, in some embodiments, there may be more radial and azimuthal electric field antennas 12 than sensors or probes, or vice versa. Additionally, there may be a one-to-many communication relationship between the radial and azimuthal electric field antennas 12 and the sensors or probes on the downhole tool 14. That is, one sensor may be capable of reading electromagnetic fields from more than one antenna 12 and one antenna 12 may transmit an electromagnetic field to more than one sensor. Although two sets of radial and azimuthal electric field antennas 12 are depicted in FIG. 1, it should be understood that any suitable number may be used to sufficiently cover the vertical extent of interest of the geological formation 18.

Data acquisition may be performed for the source positions of the radial and azimuthal electric field antennas 12 that are used to cover the vertical extent of interest of the geological formation 18. That is, for each source position of the radial electric field antenna ($J_r$) and the azimuthal electric field antenna ($J\phi$), the electric and magnetic fields may be recorded as a function of measurement positions and frequency in one or more datasets (e.g., dataset 1 (30) and dataset 2 (32)). Each dataset may include the electric and magnetic field measurements (E vector and the H vector) recorded downhole at several depths. For example, dataset 1 (30) may include electric and magnetic measurements due to a first position of the surface radial electric field antenna ($J_r$) and the zimuthal electric field antenna ($J\phi$), dataset 2 (32) may include electric and magnetic measurements due to a second position of the surface radial electric field antenna ($J_r$) and the zimuthal electric field antenna ($J\phi$), and so forth. Several excitation frequencies (e.g. DC—1000 Hz) may be used when exciting the electric and magnetic fields using the radial and azimuthal electric field antennas 12. Both dataset 1 (30) and dataset 2 (32) may be transmitted to a data processing system 34 for analysis and processing. It should be noted that any number of datasets (e.g., 1, 2, 3, 4, 5, 6, 7, 8, 9, 10, etc.) may be acquired and the number of datasets may be proportional to the number of antennas 12 on the surface.

The data processing system 34 may include a processor 36, memory 38, storage 40, and/or a display 42. The data processing system 34 may use the dataset 1 (30) and dataset 2 (32) to perform simultaneous inversions of the dataset 1 (30) and dataset 2 (32) to generate the 3D image described above. In particular, to process the dataset 1 (30) and dataset 2 (32), the processor 36 may execute instructions stored in the memory 38 and/or storage 40. In some embodiments, simultaneous inversion may be performed using all electric and magnetic fields due to all surface source antennas 12 at all positions to generate the 3D image. As such, the memory 38 and/or the storage 40 of the data processing system 34 may be any suitable article of manufacture (e.g., non-transitory computer readable medium) that can store the instructions. The memory 36 and/or the storage 40 may be ROM memory, random-access memory (RAM), flash memory, an optical storage medium, or a hard disk drive, to name a few examples. The display 42 may be any suitable electronic display that can display the 3D image and/or other information relating to the electric and magnetic fields as measured by the downhole tool 14. It should be appreciated that, although the data processing system 34 is shown by way of example as being located at the surface, the data processing system 34 may be located in the downhole tool 14, or partly at the surface and partly in the downhole tool 14.

FIG. 2 is a flow diagram of a method 50 for generating a three-dimensional (3D) image of the geological formation 18 using the data processing system 34 based on downhole electric and magnetic fields (vector E, vector H) due to radial and azimuthal surface electric antennas ($J_r$, $J\phi$), in accordance with an embodiment of the present techniques. Although the following description of the method 50 is described as being performed by the processor 36 of the data processing system 34, it should be noted that the method 50 may be performed by other processors disposed on other devices that may be capable of communicating with the radial and azimuthal electric field antennas 12 and the downhole tool 14, such as a computing device or other component associated with the drilling and/or monitoring system 10. Additionally, although the following method 50 describes a number of operations that may be performed, it should be noted that the method 50 may be performed in a variety of suitable orders. It should be appreciated that the method 50 may be wholly executed by the data processing system 34 or the execution may be distributed between another computing device and/or the data processing system 34. It should be noted that the method 50 may be implemented as computer instructions stored on the memory 38 and/or storage 40. It should be understood that the method 50 is performed using a hybrid surface-to-borehole electromagnetic (STB-EM) configuration.

Referring now to the method 50, the processor 36 may receive STB-EM measured signals from the downhole tool 14 in the borehole 24 (block 54). The STB-EM measured signals may include a vertical electric field and magnetic field measured in the borehole 24 (vector $E_B$, vector $E_B$) and may be included in dataset 1 (30) and/or dataset 2 (32). For each of the source positions of the surface antennas 12 ($J_r$, $J\phi$), the electric and magnetic fields are recorded in dataset 1 (30) and/or dataset 2 (32) as a function of measurement positions and frequency. The vertical electric and magnetic fields may have been excited by the radial and azimuthal electric antennas 12, respectively, as described above. As shown, any number of datasets including electric and magnetic field measurements may be received.

The processor 36 may perform simultaneously inversion of the dataset 1 (30) and dataset 2 (32) (block 56). The simultaneous inversion of the datasets yields an electrical model of the subsurface obtained through iterative optimization of the resistivity distribution such as to obtain a final model whose response fits equally well (statistically) both datasets 1 and 2. As such, the inversion may receive the datasets 1 (30) including vertical (vector $E_B$, vector $H_B$) for each position of radial and azimuthal antennas 12 on the surface as input. As previously discussed, for each ($J_r$, $J\phi$) source station on the surface, the measurements downhole cover the vertical extent of interest of the geological formation 18. Thus, the inversion considers the superposition of the electric field and the magnetic field (vector $E_B$, vector $E_B$) due to both radial and azimuthal electric field antenna 12 ($J_r$, $J\phi$) sources simultaneously to produce a 3D image 58 of the geological formation 18.

It should be understood that the simultaneous inversion process (block 56) benefits from the sensitivity to resistive media of the E-fields due to the radial electric field antenna $J_r$, as well as the sensitivity to conductive media of the H-fields produced by the azimuthal electric field antenna $J\phi$.

As such, the method 50 is more efficient in the delineation of contacts between resistive and conductive targets. Another benefit is that the inversion of the ratio between electric and magnetic fields downhole in the STB-EM configuration is less sensitive to the properties of the reservoir depths.

FIG. 3 is a schematic diagram of a drilling and/or monitoring system 60 including one or more downhole vertical electric and magnetic field sources 62 and one or more electromagnetic (EM) readers 64 on the surface used to perform hybrid borehole-to-surface electromagnetic (BTS-EM) measurements, in accordance with an embodiment of the present techniques. It should be noted that the hybrid BTS-EM measurement may be the reciprocal of the STB-EM measurement. The drilling and/or monitoring system 60 of FIG. 3 includes the surface equipment 16 above the geological formation 18. The surface equipment 16 may include the EM readers 64, the vehicle 20, and the drilling rig 22. In the example of FIG. 3, a drilling operation has previously been carried out to drill a wellbore 24. In addition, an annular fill 26 (e.g., cement) may have been used to seal an annulus—the space between the wellbore 24 and casing joints and collars—with cementing operations.

In some embodiments, the EM readers 64 may include one or more sensors or probes, such as an electromagnetic field (EMF) meter, which may include a frequency selected receiver and/or a spectrum analyzer. For example, the EMF measurements may include frequency selective measurements where the electric and magnetic field excited by the downhole electric and magnetic field sources 62, respectively, are measured by a frequency selected receiver or spectrum analyzer included in the EM readers 64. In such an embodiment, the frequency selected receiver or spectrum analyzer enable monitoring a frequency range of interest. In some embodiments, the EM readers 64 may include a broadband probe that enables broadband EMF measurements. The broadband probe may sense any signal across a wide range of frequencies. In some embodiments, the EM readers 64 may include an electric field (E-field) sensor and a magnetic field (H-field) sensor that is used to measure the E-field and the H-field excited by the electric and magnetic field sources 62, respectively. In some embodiments, the E-field sensor and H-field sensor may be mono-axial or isotropic (tri-axial). The mono-axial sensor or probe may sense the E-field or H-field linearly polarized in a given direction. The tri-axial sensor or probe may take three independent measurements using sensing elements orthogonal to each other.

The electric and magnetic field sources 62 may be located downhole in the borehole 24. As such, the electric and magnetic field sources 62 may be conveyed through the wellbore 24 by the cable 28 through the drilling rig 22 by the vehicle 20. Such a cable 28 may be a mechanical cable, an electrical cable, or an electro-optical cable that includes a fiber line protected against the harsh environment of the wellbore 24. In other examples, however, the downhole tool 14 may be conveyed using any other suitable conveyance, such as coiled tubing.

The electric and magnetic field sources 62 may transmit the electric and magnetic fields (e.g., electromagnetic waves) when a voltage is applied to and current flows through the sources 62 as a result of electrons vibrating along the sources 62. In some embodiments, the electric and magnetic sources 62 may take any suitable form that is capable of exciting an electric field and a magnetic field. As described in detail below, various acquired datasets of the measured electric and magnetic field generated by the vertical electric and magnetic field sources 62 in the borehole 24 may be simultaneously inverted to produce a 3D image of the vertical extent of interest of the geological formation 18.

The number of vertical electric and magnetic field sources 62 and the number of surface EM readers 64 used in the drilling and/or monitoring system 60 may vary. In some embodiments, any suitable number of field sources 62 and EM readers 64 may be used to cover the vertical extent of interest of the geological formation 18. In some embodiments, there may be a one-to-one relationship between the number of field sources 62 and the number of EM readers 64. However, in some embodiments, more field sources 62 may be used in the system 60 than EM readers 64, or vice versa. Additionally, there may be a one-to-many communication relationship between the field sources 62 and the surface EM readers 64. That is, one EM reader 64 may be capable of reading electromagnetic fields from more than one field source 62 and one field source 62 may transmit an electromagnetic field to more than one EM reader 64. Although four sets of field sources 62 and EM readers 64 are depicted in FIG. 3, it should be understood that any suitable number may be used to sufficiently cover the vertical extent of interest of the geological formation 18.

Data acquisition may be performed for each of the EM readers 64 on the surface that measure the E vector for the E-field and the H vector for the H-field, which may be included in dataset 1 (66) and/or dataset 2 (68) for various depths. Each dataset may refer to an array of multiple measurements of all components of electric and magnetic field recorded on the surface due to the excitation source located at various positions at differing depths. As previously noted, the excitation source may be an electric antenna or a magnetic coil (e.g., J, M in FIG. 3). That is, for each source position of the vertical electric field source (vector J) and the vertical magnetic field source (vector M), the electric and magnetic fields may be recorded as a function of measurement positions and frequency in dataset 2 (68). Several excitation frequencies may be used when exciting the electric and magnetic fields using the field sources 62. Both dataset 1 (30) and dataset 2 (32) may be transmitted to the data processing system 34 for analysis and processing.

The data processing system 34 may include the processor 36, memory 38, storage 40, and/or a display 42. The data processing system 34 may use the dataset 1 (66) and dataset 2 (68) to perform simultaneous inversions of the dataset 1 (66) and dataset 2 (68) to generate the 3D image described above. The inversion may be performed simultaneously for all EM readers 64 positions and recorded fields on the surface due to both electric (J) and magnetic (M) downhole sources. Although only two datasets are depicted, any number of suitable datasets may be received and simultaneously inverted. In particular, to process the dataset 1 (66) and dataset 2 (68), the processor 36 may execute instructions stored in the memory 38 and/or storage 40. As such, the memory 38 and/or the storage 40 of the data processing system 34 may be any suitable article of manufacture (e.g., non-transitory computer readable medium) that can store the instructions. The memory 36 and/or the storage 40 may be ROM memory, random-access memory (RAM), flash memory, an optical storage medium, or a hard disk drive, to name a few examples. The display 42 may be any suitable electronic display that can display the 3D image and/or other information relating to the electric and magnetic fields as measured by EM readers 64. It should be appreciated that, although the data processing system 34 is shown by way of example as being located at the surface, the data processing system 34 may be located in the downhole tool 14, or partly at the surface and partly in the downhole tool 14.

Figure 4:
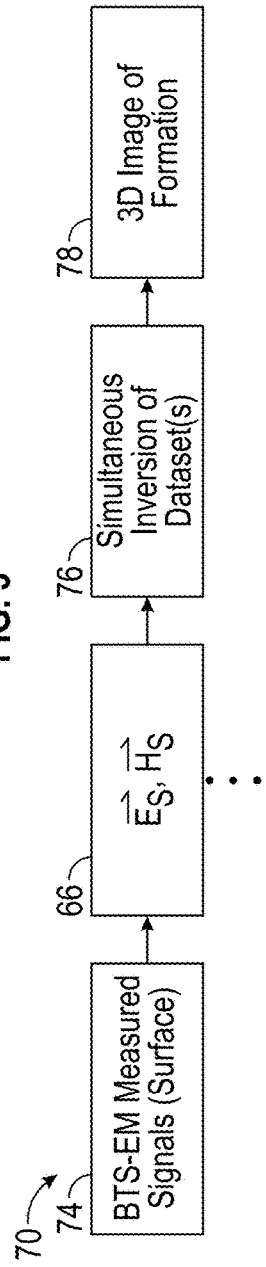
FIG. 4 is a flow diagram of a method for generating a three-dimensional (3D) image of a formation using the data acquisition system of FIG. 3 based on surface electromagnetic (EM) measurements excited by both vertical electric and magnetic field sources located downhole, in accordance with an embodiment of the present techniques.

FIG. 4 is a flow diagram of a method 70 for generating a three-dimensional (3D) image of the geological formation 18 using the data acquisition system 34 of FIG. 3 based on surface electromagnetic (EM) measurements (vector E, vector H) excited by both the vertical electric and magnetic field sources 62 (vector J, vector M) located downhole, in accordance with an embodiment of the present techniques. Although the following description of the method 70 is described as being performed by the processor 36 of the data processing system 34, it should be noted that the method 50 may be performed by other processors disposed on other devices that may be capable of communicating with the EM readers 64 and the vertical electric and magnetic field sources 62, such as a computing device or other component associated with the drilling and/or monitoring system 60. Additionally, although the following method 70 describes a number of operations that may be performed, it should be noted that the method 70 may be performed in a variety of suitable orders. It should be appreciated that the method 70 may be wholly executed by the data processing system 34 or the execution may be distributed between another computing device and/or the data processing system 34. It should be noted that the method 70 may be implemented as computer instructions stored on the memory 38 and/or storage 40. It should be understood that the method 70 is performed using a hybrid borehole-to-surface electromagnetic (BTS-EM) configuration.

Referring now to the method 70, the processor 36 may receive BTS-EM measured signals from the EM readers 62 at the surface (block 74). The BTS-EM measured signals may include a vertical electric field and magnetic field measured at the surface (vector $E_S$, vector $H_S$) and may be included in dataset 1 (66) and/or dataset 2 (68) for each position (e.g., depth) of the vertical electric and magnetic field sources 62. For each of the source positions of the sources 62, the electric and magnetic fields may be recorded in dataset 1 (66) and/or dataset 2 (68) as a function of measurement positions and frequency. The vertical electric and magnetic fields may have been excited by the vertical electric and magnetic field sources 62, respectively, as described above.

The processor 36 may perform simultaneously inversion of the dataset 1 (66) and dataset 2 (68) (block 76). As such, the inversion may receive the datasets 1 (66) and dataset 2 (68) each including (vector $E_S$, vector $H_S$) for different sources 62 at each depth as input. As previously discussed, for each (vector J, vector M) source in the borehole 24, the measurements at the EM readers 64 on the surface cover the vertical extent of interest of the geological formation 18. Thus, the inversion considers the superposition of the electric field and the magnetic field (vector $E_S$, vector $H_S$) due to both the vertical electric and magnetic field sources 62 (vector J, vector M) simultaneously to produce a 3D image 78 of the geological formation 18. A benefit of using the method 70 for the BTS-EM configuration is that the inversion of the the surface impedance of the electric and magnetic fields is less sensitive to the properties of the reservoir depths.

Figure 5A:
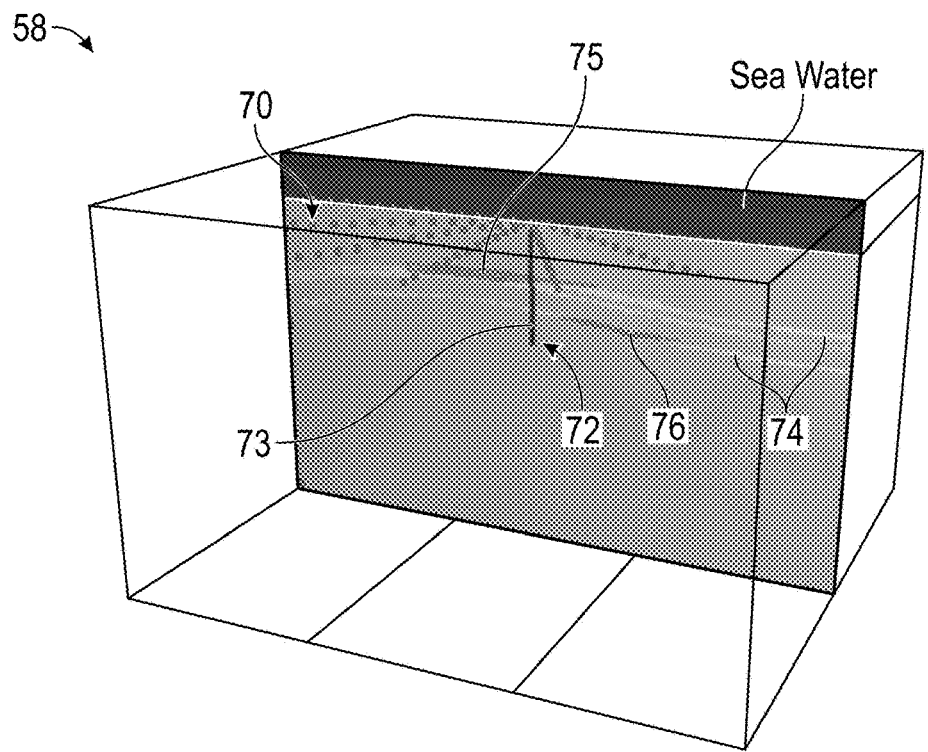
FIG. 5A is an example of a 3D image of the geological formation that resulted from the hybrid STB-EM method of FIG. 2.
Figure 5B:
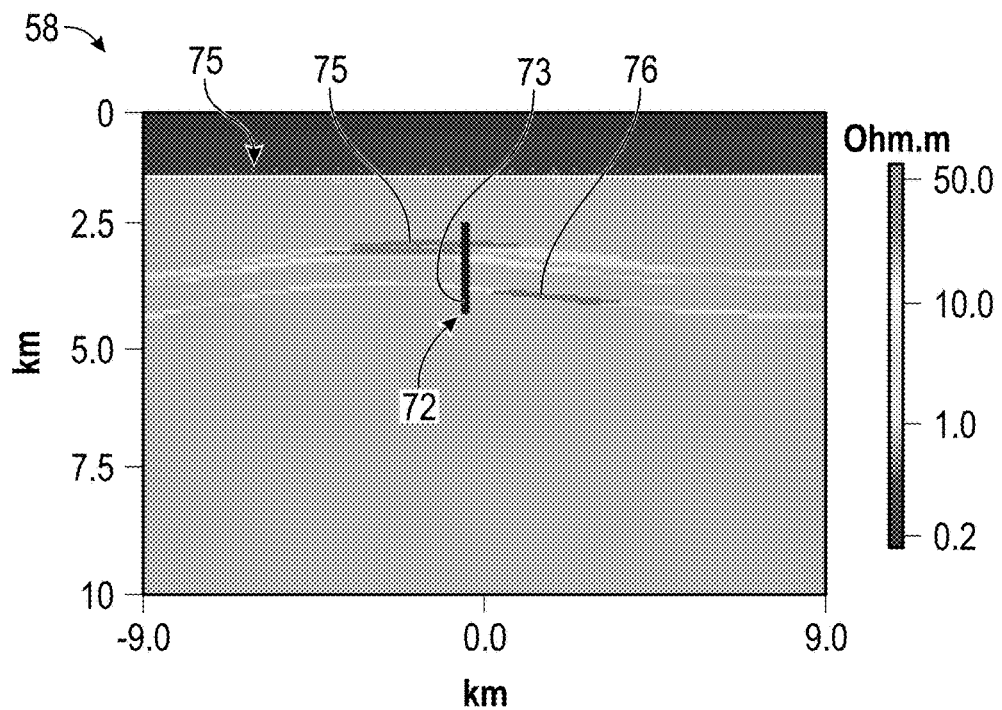
FIG. 5B is a cross-section of the example 3D image, in accordance with an embodiment of the present techniques.

FIG. 5A is an example the three-dimensional (3D) image 58 of the geological formation 18 that may result from the hybrid STB-EM method 50 and FIG. 5B is a cross-section of the example 3D image 58. The 3D image 58 may provide a highly valuable image of the geological formation 18. Using the 3D image 58, human operators may more effectively manage the production of the well and/or drill new wells through the geological formation 18. It should be appreciated that 3D images 58 and 78 alike may provide substantial value by describing interior aspects of the geological formation 18.

It should be noted that the 3D image 58 resulted from simultaneous inversion of marine STB-EM data using the disclosed techniques. The dots 70 represent the radial and azimuthal antenna 12 source locations and the EM reader receivers 72 are inside the wellbore 73, which is the vertical black line. The 3D image 58 clearly identifies two horizons 74 that each includes a reservoir. The two reservoirs include a top reservoir indicated by the darkness of line 75 intercepted by the borehole and a deeper flank reservoir indicated by the darkness of line 76, which is approximately 500 meters away from the well. Using the disclosed techniques enables identifying both the top reservoir 75 and the deep flank reservoir 76. By performing the simultaneous inversion of at least two data sets, better sensitivity and resolution for at least the deep reservoir 76 may be obtained, which can be seen from the inverted resistivity 3D image 58.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

The invention claimed is:

1. A method comprising:
generating simultaneously an electric field and a magnetic field in a geological formation via an electric source and a magnetic source respectively, wherein the electric source and the magnetic source are different types of sources;
measuring the electric field and the magnetic field in order to obtain electric field dataset and magnetic field dataset;
simultaneously inverting the electric field dataset and magnetic field dataset;
using a processor, generating an image representative of at least a characteristic of a portion of the geological formation based on the measured electric and magnetic fields, wherein the electric field and the magnetic field are measured from a borehole penetrating the geological formation, wherein the electric source and the magnetic source are deployed on a surface above the geological formation, and
wherein the electric source is a radial electric field antenna and the magnetic source is an azimuthal electric field antenna.

2. The method of claim 1, wherein the electric field and the magnetic field are measured from a surface above the geological formation.

3. The method of claim 2, wherein the electric source and the magnetic source are deployed in a borehole penetrating the geological formation.

4. The method of claim 3, wherein the electric source and the magnetic source are deployed on a tool lowered in the borehole.

5. The method of claim 1, wherein the electric field and the magnetic field are measured by a single sensor.

6. The method of claim 1, wherein the electric field and the magnetic field are measured by different sensors.

7. The method of claim 1, wherein the electric source and the magnetic source are delivered by a single device comprising the different types of sources.

8. The method of claim 1, wherein the electric source and the magnetic source are delivered by different devices.

9. The method of claim 1, wherein the image of the portion of the geological formation is a three-dimensional (3D) image.

10. The method of claim 1, further comprising:
receiving the electric field and the magnetic field into a dataset; and
simultaneously reversing the dataset.

11. The method of claim 10, further comprising:
receiving a plurality of datasets, each comprising the electric field and the magnetic field measured at a different position of the electric source and the magnetic source; and simultaneously reversing the plurality of datasets.

12. The method of claim 10, further comprising:
receiving a plurality of datasets, each comprising the electric field and the magnetic field measured at a different frequency of the electric source and the magnetic source; and simultaneously reversing the plurality of datasets.

13. A method comprising:
receiving into one or more processors one or more datasets including vertical electric and magnetic fields measured from a downhole tool in a borehole penetrating the geological formation, wherein the electric and magnetic fields comprise a response of a geological formation simultaneously excited by one or more radial field antennas and one or more azimuthal electric field antennas deployed on a surface above the geological formation, wherein the one or more azimuthal electric field antennas are different from the one or more radial field antennas, wherein each of the one or more datasets corresponds to a different position of the one or more radial electric field antennas and the one or more azimuthal field antennas;
simultaneously inverting the one or more datasets using the one or more processors generating inverted data;
creating, using the one or more processors, an electrical model of the geological formation based at least in part on the inverted data, whose response fits the one or more datasets; and
based on the electrical model, generating by the one or more processors a three-dimensional (3D) image representative of at least a characteristic of a portion of the geological formation.

14. The method of claim 13, comprising measuring the vertical electric and magnetic field using one or more electromagnetic field meters of the downhole tool.

15. The method of claim 13, comprising recording, as a part of the one or more datasets, the electric and magnetic field at a surface of the geological formation as a function of measurement positions and frequency for each of the one or more radial and electric field antennas and the one or more azimuthal field antennas.

16. The method of claim 13, comprising exciting the one or more radial electric field antennas and the one ore more azimuthal field antennas at several frequencies to transmit the vertical electric and magnetic fields.

17. A method comprising:
receiving into one or more processors one or more datasets including electric and magnetic fields from an electromagnetic reader on the surface of a geological formation, wherein the electric and magnetic fields are generated simultaneously by one or more electric downhole sources and one or more magnetic downhole sources, wherein the one or more electric downhole sources comprises a radial electric field antenna and the one or more magnetic downhole sources comprises an azimuthal field antenna;
simultaneously inverting the one or more datasets using the one or more processors, wherein it comprises yielding an electrical model of the geological formation whose response fits the one or more datasets; and
based on the model and using a processor, generating by the one or more processors a three-dimensional (3D) image representative of at least a characteristic of a portion of the geological formation.

* * * * *